US011680755B2

(12) United States Patent
Wei (10) Patent No.: US 11,680,755 B2
(45) Date of Patent: Jun. 20, 2023

(54) AIR-PERMEABLE CARRIER HAVING EMBEDDED TEMPERATURE ADJUSTING UNIT AND MANUFACTURING METHOD THEREOF

(71) Applicant: SEDA CHEMICAL PRODUCTS CO., LTD., New Taipei (TW)

(72) Inventor: Chi-Shu Wei, New Taipei (TW)

(73) Assignee: SEDA CHEMICAL PRODUCTS CO., LTD., New Taipei (TW)

( * ) Notice: Subject to any disclaimer, the term of this patent is extended or adjusted under 35 U.S.C. 154(b) by 0 days.

(21) Appl. No.: 17/020,743

(22) Filed: Sep. 14, 2020

(65) Prior Publication Data

US 2021/0404747 A1 Dec. 30, 2021

(30) Foreign Application Priority Data

Jun. 30, 2020 (TW) ................................. 109122072

(51) Int. Cl.
*F28D 20/02* (2006.01)
(52) U.S. Cl.
CPC ......... *F28D 20/023* (2013.01); *F28D 20/026* (2013.01)
(58) Field of Classification Search
CPC .... F28D 20/023; F28D 20/025; F28D 20/026; A47C 21/046; A47C 27/006; A47C 27/007
See application file for complete search history.

(56) References Cited

U.S. PATENT DOCUMENTS

| 4,003,426 A | * | 1/1977 | Best | F28D 20/023 52/173.3 |
| 4,408,659 A | * | 10/1983 | Hermanns | F28D 19/02 165/104.11 |
| 4,654,256 A | * | 3/1987 | Doree | F28D 20/023 428/905 |

(Continued)

FOREIGN PATENT DOCUMENTS

| CN | 107760274 A | * | 3/2018 | ............... C09K 5/06 |
| CN | 210810115 U | | 6/2020 | |

(Continued)

OTHER PUBLICATIONS

CN-107760274-A-English-machine-translation (Year: 2017).*

*Primary Examiner* — Tho V Duong
(74) *Attorney, Agent, or Firm* — CIPO IP Group (57) ABSTRACT

An air-permeable carrier includes at least one temperature adjusting unit and a carrier body having a plurality of pores. The temperature adjusting unit includes an adhesive and a plurality of phase change microcapsules. The temperature adjusting unit is distributed and fixedly embedded within the carrier body by an adhesive-dispensing injection process, such that the temperature adjusting unit is filled in at least one of the pores in a partial region of the carrier body to form at least one temperature adjusting region at a position corresponding and proximate to the temperature adjusting unit. Each horizontal distance or vertical distance between any two adjacent temperature adjusting units can be substantially the same or different, so that when a user leans against the carrier, phase change microcapsules can be communicated with air from the surrounding environment through the pores to achieve the effect of heat adjustment.

18 Claims, 6 Drawing Sheets

(56) References Cited

U.S. PATENT DOCUMENTS

| | | | | |
|---|---|---|---|---|
| 4,688,283 A * | 8/1987 | Jacobson | | A47C 27/10 |
| | | | | 5/709 |
| 4,964,402 A * | 10/1990 | Grim | | F28D 20/023 |
| | | | | 602/2 |
| 5,366,801 A * | 11/1994 | Bryant | | D06N 3/14 |
| | | | | 428/313.5 |
| 5,532,039 A * | 7/1996 | Payne | | B32B 15/08 |
| | | | | 428/323 |
| 5,637,389 A * | 6/1997 | Colvin | | A43B 7/34 |
| | | | | 2/5 |
| 5,722,482 A * | 3/1998 | Buckley | | F28D 20/023 |
| | | | | 428/317.9 |
| 5,851,338 A * | 12/1998 | Pushaw | | D06M 23/04 |
| | | | | 427/244 |
| 5,955,188 A * | 9/1999 | Pushaw | | D06M 23/12 |
| | | | | 428/323 |
| 6,319,599 B1 * | 11/2001 | Buckley | | C09K 5/063 |
| | | | | 36/83 |
| 6,464,672 B1 * | 10/2002 | Buckley | | C09K 5/063 |
| | | | | 602/41 |
| 6,619,049 B1 * | 9/2003 | Wu | | H05K 7/20 |
| | | | | 62/529 |
| 6,699,266 B2 * | 3/2004 | Lachenbruch | | A61G 7/05715 |
| | | | | 607/108 |
| 6,772,825 B2 * | 8/2004 | Lachenbruch | | A61F 7/0053 |
| | | | | 5/655.5 |
| 6,855,410 B2 * | 2/2005 | Buckley | | A41D 31/065 |
| | | | | 428/313.5 |
| 7,135,424 B2 * | 11/2006 | Worley | | A41D 31/065 |
| | | | | 428/206 |
| 7,670,968 B2 * | 3/2010 | Bohringer | | A41D 31/305 |
| | | | | 442/131 |
| 9,346,385 B2 | 5/2016 | Sachs | | |
| 9,895,004 B2 * | 2/2018 | Wang | | B68G 5/02 |
| 10,675,198 B2 | 6/2020 | Brykalski | | |
| 2002/0164473 A1 * | 11/2002 | Buckley | | C08K 5/0008 |
| | | | | 2/93 |
| 2002/0164474 A1 * | 11/2002 | Buckley | | C08K 5/0008 |
| | | | | 2/93 |
| 2003/0109908 A1 * | 6/2003 | Lachenbruch | | A61F 7/02 |
| | | | | 5/690 |
| 2004/0043212 A1 * | 3/2004 | Grynaeus | | D06M 23/12 |
| | | | | 442/61 |
| 2007/0290392 A1 * | 12/2007 | Lawton | | C04B 20/10 |
| | | | | 427/407.1 |
| 2008/0233368 A1 * | 9/2008 | Hartmann | | D06M 23/12 |
| | | | | 428/206 |
| 2010/0203788 A1 * | 8/2010 | Kimura | | D04H 1/55 |
| | | | | 156/60 |
| 2015/0067967 A1 * | 3/2015 | Tyree | | A47C 27/15 |
| | | | | 5/691 |
| 2016/0166074 A1 * | 6/2016 | Rose | | B68G 11/04 |
| | | | | 5/636 |
| 2018/0020842 A1 * | 1/2018 | Wang | | B68G 5/02 |
| | | | | 5/421 |
| 2020/0113345 A1 | 4/2020 | DeFranks | | |

FOREIGN PATENT DOCUMENTS

| | | |
|---|---|---|
| CN | 210842391 U | 6/2020 |
| JP | H26-2014028948 A | 2/2014 |
| JP | H30-2018027299 A | 2/2018 |
| JP | R01-3223530 U | 10/2019 |
| TW | 202002857 A | 1/2020 |

\* cited by examiner

AIR-PERMEABLE CARRIER HAVING EMBEDDED TEMPERATURE ADJUSTING UNIT AND MANUFACTURING METHOD THEREOF

CROSS-REFERENCE TO RELATED PATENT APPLICATION

This non-provisional application claims priority to and the benefit of, under 35 U.S.C. § 119(a), Taiwan Patent Application No. 109122072, filed in Taiwan on Jun. 30, 2020. The entire content of the above identified application is incorporated herein by reference.

FIELD

The present disclosure relates to an air-permeable carrier and a manufacturing method thereof, and more particularly to an air-permeable carrier having at least one temperature adjusting unit embedded therein, each temperature adjusting unit being distributed and fixedly embedded within a carrier body of the air-permeable carrier by an adhesive-dispensing injection process, such that when a user leans against the carrier body, phase change microcapsules of the temperature adjusting unit can be communicated with air from the surrounding environment through pores formed on the carrier body, so as to achieve the effect of heat dissipation.

BACKGROUND

A phase change material refers to a substance with high heat of fusion, and can melt or solidify at specific temperatures to absorb or release heat through transition of phases. Industrial use of phase change materials can have its origin traced back to the 1950's, with widespread research and use thereof beginning in the 1970's. Today, applications of the phase change materials can be seen in materials used across industries such as construction, fabric, bedding, aerospace, and cooling.

There are currently over 6000 kinds of known phase change materials, which can be classified principally into the following four types: inorganic phase change materials (e.g., salt hydrates), organic phase change materials (e.g., paraffin wax, fatty acids and polymers thereof), polymeric phase change materials, and composite phase change materials. Generally, when a phase change material is applied in a mattress, the phase change material is fabricated as a microcapsule. A microcapsule is produced through microencapsulation, which involves enclosing phase change materials in solid, liquid, or gaseous states within a miniature capsule. As one of the faster developing and widely applicable techniques that have reached a certain degree of maturity, in microencapsulation, the casing used for enclosing the phase change materials is referred to as the "wall material", while the phase change materials within is referred to as the "core material". According to practical requirements, the volume of phase change microcapsules can be around 0.01 μm-1000 μm, and the shape thereof can be spherical, grain-like, or lump-like.

When manufacturing the mattress, the phase change microcapsules are either mixed into a foam material before the mattress is produced, coated upon the surface of the mattress, or arranged between two layers of the foam material, so as to absorb heat from the external environment through the microcapsules. Therefore, mattresses with properties provided by the phase change material should theoretically be able to rapidly dissipate heat, so as to afford a user with a relatively comfortable environment when lying down, without the need for frequent usage of temperature-adjusting electronic devices such as air conditioners or heaters.

However, regardless of whether the phase change microcapsules are mixed into the foaming material, coated upon the surface of the mattress, or arranged between two layers of foam material, certain difficulties can arise from practical implementation thereof. The issue with mixing the phase change microcapsules into the foaming material resides in that when the phase change microcapsules are mixed into the foam material in the process of manufacturing the mattress, the phase change microcapsules disturb the elasticity and smoothness of the mattress, which results in a decline in quality. The issue with coating the phase change microcapsules upon the surface of the mattress resides in that when the user is lying down upon the mattress, since his or her body will cover and press against the phase change microcapsules, which causes the phase change microcapsules to rapidly absorb an excessive amount of heat and be unable to lower the temperature through the temperature of the external environment (due to the surface areas of the phase change microcapsules being covered upon by the body of the user and the foam material respectively), the mattress will ultimately fail to achieve the expected effect because the accumulated heat cannot be dissipated. The issue with the phase change microcapsules being arranged between two layers of the foam material resides in that the depth at which they are arranged is relatively fixed, so that the relative depth at which the phase change microcapsules are disposed cannot be freely adjusted according to practical requirements. Furthermore, the adhesion of multiple layers of foam material not only necessitates extra costs in labor and time, the adhesive layer between adjacent foam materials can negatively affect the overall softness of the foam material. Therefore, how conventional pad structures can be improved from the basis of properties associated with phase change microcapsules has become an important subject of the present disclosure.

SUMMARY

In response to the above-referenced technical inadequacies associated with the application of phase change microcapsules to conventional mattresses, namely, that the yield may be negatively affected or that the accumulated heat may fail to be dissipated, through years of practical experience in relevant research, testing, and improvement, an air-permeable carrier that can resolve the long-standing issue with heat accumulation is provided in the present disclosure.

In one aspect, the present disclosure is directed to an air-permeable carrier having embedded temperature adjusting unit(s), including a carrier body and at least one temperature adjusting unit. The carrier body has a plurality of pores and is flexible. The carrier body can be a microporous elastomer body (e.g., polyurethane foam) or a fiber assembly (e.g., polyester cotton or 3D fabric). Each temperature adjusting unit includes a plurality of phase change microcapsules and an adhesive. The plurality of phase change microcapsules and the adhesive are mixed at a ratio of 50.0-90.0:10.0-50.0 based on the weight percentages of the phase change microcapsules and the adhesive. The temperature adjusting unit(s) can be distributed and fixedly embedded within the carrier body by an adhesive-dispensing injection process, so that each temperature adjusting unit can fill the pore(s) at a partial region of the carrier body, such that at least one temperature adjusting region can be formed at at least one position proximal and corresponding to the temperature adjusting units, respectively. Each horizontal distance or vertical distance between each two adjacent temperature adjusting units can be substantially the same or different, so that when a user leans against the air-permeable carrier, the plurality of phase change microcapsules of the temperature adjusting unit(s) can be communicated with air from the surrounding environment through the pores, so as to achieve the effect of temperature adjustment.

In another aspect, the present disclosure provides a method for manufacturing an air-permeable carrier embedded with at least one temperature adjusting unit. The method includes placing a carrier body having a plurality of pores and being flexible on a platform of an adhesive dispensing machine; extending, by the dispensing machine, an adhesive-dispensing nozzle of the dispensing machine into a predetermined position in the carrier body according to at least one control signal; injecting in the carrier body the at least one temperature adjusting unit including an adhesive and a plurality of phase change microcapsules mixed in the adhesive; and filling at least one of the pores in a partial region of the carrier body with the at least one temperature adjusting unit to form at least one temperature adjusting region proximate and corresponding to the predetermined position. Therefore, since the air-permeable carrier produced by the aforementioned method has a simpler structure and does not involve a foaming process of a foam material, both the product yield and quality of the air-permeable carrier thus manufactured can be upheld, so as to be used with other relevant products of different shapes and sizes.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, materials, objects, or the like, which are for distinguishing one component/material/object from another one only, and are not intended to, nor should be construed to impose any substantive limitations on the components, materials, objects, or the like.

As used herein, the term "substantially" refers to, for example, a value, or an average of values, in an acceptable deviation range of a particular value recognized or decided by a person of ordinary skill in the art, taking into account any specific quantity of errors related to the measurement of the value that may resulted from limitations of a measurement system or device. For example, "substantially" may indicate that the value is within, for example, ±5%, ±3%, ±1%, ±0.5% or ±0.1%, or one or more standard deviations, of the particular value.

Figure 1:
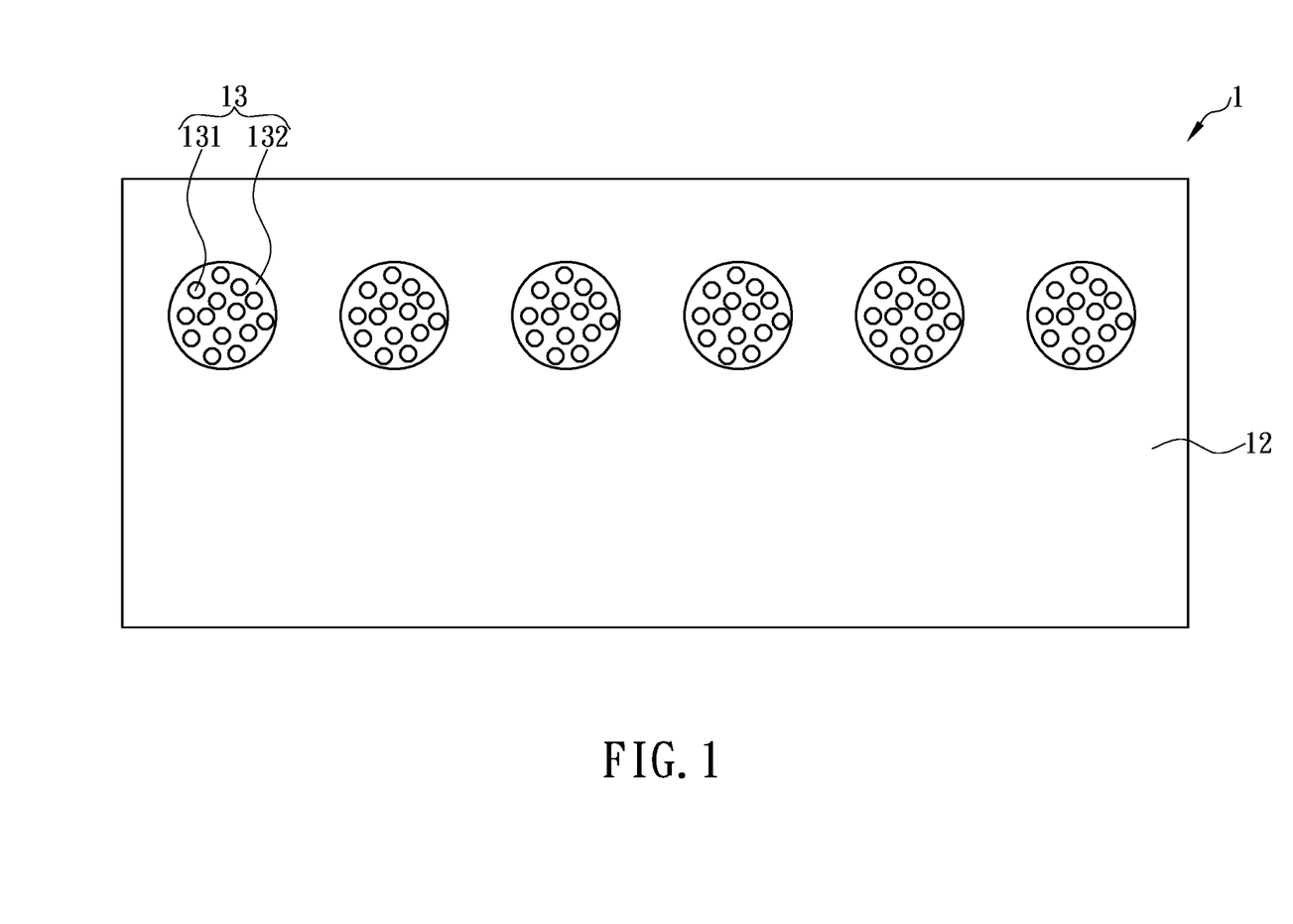
FIG. 1 is a side view of an air-permeable carrier according to certain embodiments of the present disclosure.

The present disclosure provides an air-permeable carrier having at least one embedded temperature adjusting unit and a manufacturing method thereof. The air-permeable carrier 1 can serve as the material for products such as mattresses, cushions, or protective gear. Referring to FIG. 1, for ease of illustration only, positional relationships in FIG. 1 may be adopted infra by the present disclosure to facilitate understanding, with the top side of FIG. 1 being taken as the top side of the components therein, the bottom side of FIG. 1 being taken as the bottom side of the components therein, the right part of FIG. 1 being taken as the right sides of the components therein, and the left part of FIG. 1 being taken as the left sides of the components therein. In certain embodiments, the air-permeable carrier 1 includes a carrier body 12 and at least one temperature adjusting unit 13. The carrier body 12 has an elastic property and is therefore flexible, and has a plurality of pores. The plurality of pores are staggeredly arranged in different layers, and at least part or all of the pores are in spatial communication with each other, so that the carrier body 12 has good air permeability (breathability), buffering, and pressure relief characteristics.

Referring again to FIG. 1, the carrier body 12 can be a microporous elastomer body (e.g., polyurethane foam) or a fiber assembly (e.g., polyester cotton or 3D fabric). The microporous elastomer body refers to an elastic material having micropores formed thereon and/or therein, which can be formed through reaction injection molding (RIM) or other molding techniques, and has good elasticity and large deformability so as to absorb relatively greater impact and shock. In addition, the microporous elastomer body can include at least one of polyurethane, polyethylene, ethylene-vinyl acetate copolymer, melamine, polyvinyl chloride, thermoplastic rubber, latex, silica gel, etc. Furthermore, the fiber assembly can include flexible fibers and be formed through a specific textile molding process to produce a textile having high structural stability (e.g., polyester cotton, 3D fabric), and the pores are then formed on the fiber assembly. The fiber assembly can include at least one of polyester, polyamide, polyethylene, polypropylene, polyurethane, polyimide, etc. Furthermore, in a situation where the air-permeable carrier 1 is manufactured as a mattress, the carrier body 12 can achieve the effects of buffering and pressure relief, such that when a user lies upon the carrier body 12, a force resulting from the body weight of the user is evenly transferred from a top surface of the carrier body 12 toward a bottom surface of the carrier body 12, while a heat (or thermal energy) generated by the user can be dispersed into the plurality of pores, and then be dissipated into the external environment through the pores.

Referring again to FIG. 1, in certain embodiments, each of the temperature adjusting units 13 includes a plurality of phase change microcapsules 131 and an adhesive 132 (e.g., resin). A phase change microcapsule 131 is formed by packaging at least one phase change material into a casing of a microcapsule. In addition, the plurality of phase change microcapsules 131 are microscopic in size, and is indiscernible through the naked eye. The phase change microcapsules 131 are only schematically shown in figures of the present disclosure to illustrate their exemplary relative positionings only. The phase change microcapsules 131 are mixed with the adhesive 132 so that the adhesive 132 encloses the phase change microcapsules 131. Each of the temperature adjusting units 13 are then distributed and fixedly embedded within the carrier body 12 by an adhesive-dispensing injection process. Since the carrier body 12 has the plurality of pores, the temperature adjusting units 13 can fill the pore(s) at a partial region of the carrier body 12, and the adhesive 132 can ensure that the plurality of phase change microcapsules 131 are securely embedded in groups within the carrier body 12. At this time, temperature adjusting regions can be formed on the carrier body 12 at positions proximal to and corresponding to each of the temperature adjusting units 13.

Figure 2:
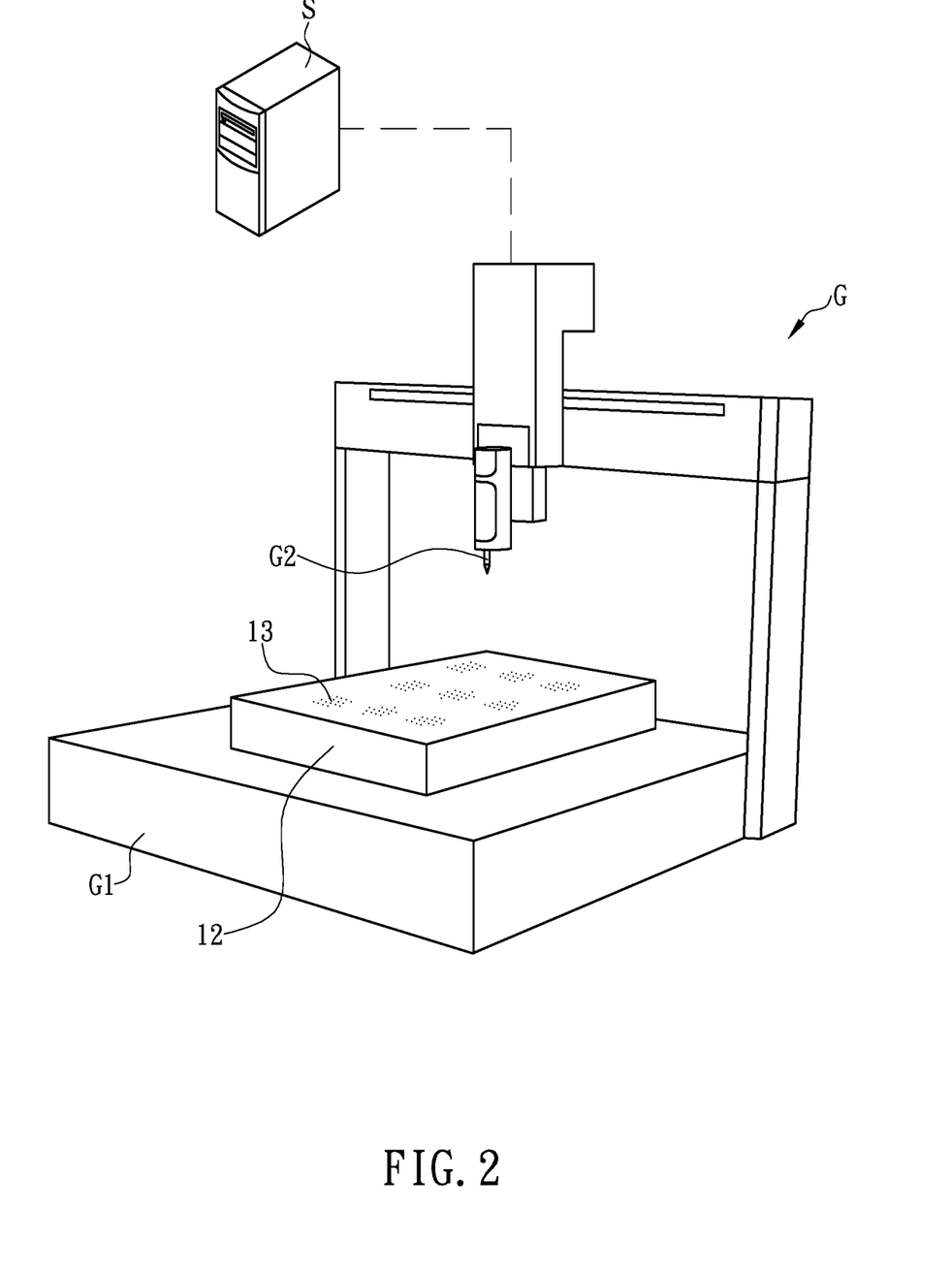
FIG. 2 is a schematic view of an adhesive dispensing machine and the air-permeable carrier according to certain embodiments of the present disclosure.

Referring to FIGS. 1 and 2, in certain embodiments, the phase change microcapsules 131 and the adhesive 132 are mixed at a ratio of 50.0-90.0:10.0-50.0 based on percent by weight, so as to form the temperature adjusting units 13. Subsequently, the temperature adjusting units 13 are filled into an adhesive dispensing machine G. An operator then places the carrier body 12 onto a platform G1 of the adhesive dispensing machine G. The operator can set and determine, according to practical requirement, through and in a terminal device S (e.g., a computer), where the temperature adjusting units 13 are to be injected, and the amount that they are to be injected, in the carrier body 12, so as to control the positions of the temperature adjusting regions and the respective ranges of the temperature to be adjusted in the temperature adjusting regions. The terminal device S can transmit to the adhesive dispensing machine G at least one control signal including information such as where the temperature adjusting units 13 are to be injected, and the amount that they are to be injected, in the carrier body 12. The adhesive dispensing machine G can, according to the control signal, have an adhesive-dispensing nozzle G2 thereof extending into the carrier body 12 from a bottom surface of the carrier body 12 to reach at least one predetermined position. The adhesive dispensing machine G presses the temperature adjusting unit(s) 13 into a feeding tube of the adhesive dispensing machine G that is connected to a piston of the adhesive dispensing machine G, and when the piston thrusts upward, a piston chamber of the piston is filled with the temperature adjusting unit(s) 13 (i.e., the plurality of phase change microcapsules 131 and the adhesive 132), and when the piston thrusts downward, the temperature adjusting unit(s) 13 is squeezed through the adhesive-dispensing nozzle G2 and then injected into the carrier body 12, so as to form the corresponding temperature adjusting region(s) in the carrier body 12. However, in certain embodiments, the adhesive-dispensing nozzle G2 can also be extended into the carrier body 12 from the top surface of the carrier body 12, and the terminal device S may be directly integrated with the adhesive-dispensing machine G to form a single device, as long as an operator is able to configure the settings of the terminal device to generate a control signal and to control the adhesive-dispensing machine G to perform the adhesive-dispensing injection process and inject the temperature adjusting unit(s) 13 into the carrier body 12.

Figure 3:
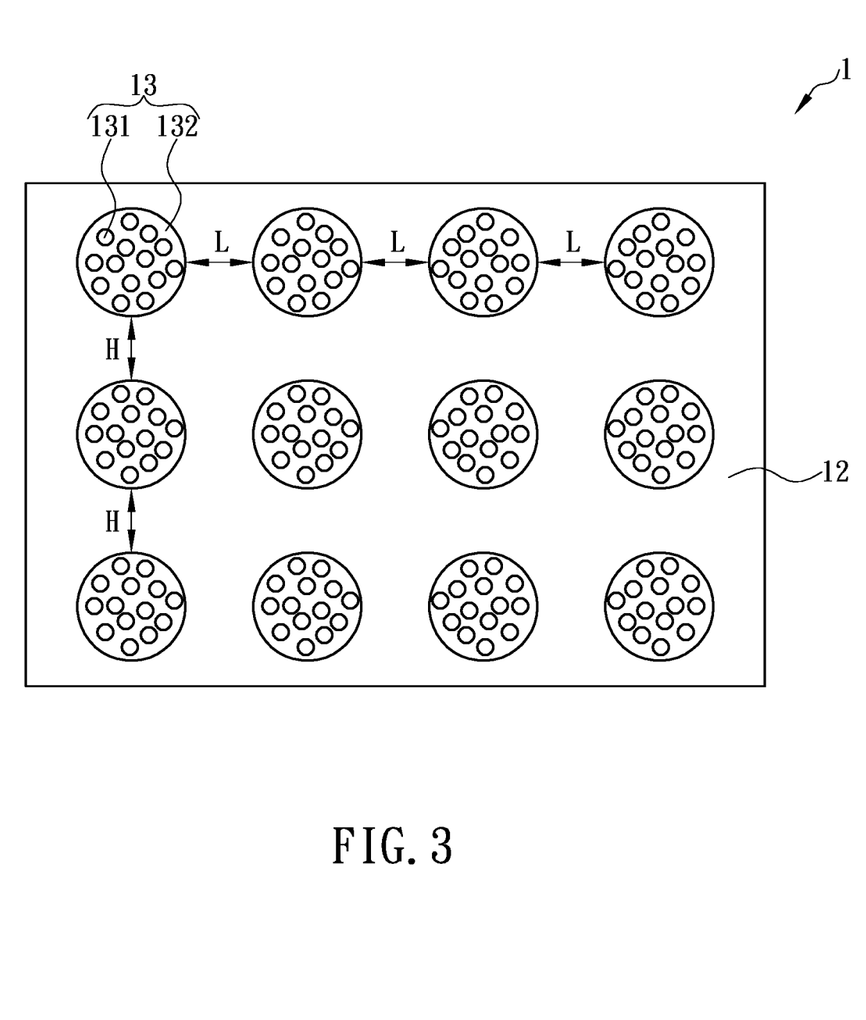
FIG. 3 is a side view of an air-permeable carrier according to certain embodiments of the present disclosure.

Referring to FIG. 3, the carrier body 12 can have a plurality of temperature adjusting units 13 disposed therein, and in certain embodiments, each horizontal distance L between any two adjacent temperature adjusting units 13 on at least one longitudinal cross section of the carrier body 12 that are disposed in a horizontal row are the same or substantially the same, and/or each vertical distance H between any two adjacent temperature adjusting units 13 on at least one longitudinal cross section of the carrier body 12 that are disposed in a vertical column are the same or substantially the same. The horizontal distance L and the vertical distance H can be the same or different from each other. Since the plurality of phase change microcapsules 131 in the temperature adjusting units 13 change from a solid state to a liquid state upon absorbing heat, and a large amount of latent heat is stored or released by the temperature adjusting units 13 during the transition between the solid and liquid states, the temperature is essentially maintained at a fixed phase change temperature. The heat absorption process of the plurality of phase change microcapsules 131 can be viewed as a form of thermal conduction, that is, a process in which thermal energy transfers from higher-temperature regions to lower-temperature regions as a result of vibrational energy being transferred from one molecule to another. Therefore, manufacturers need only have the temperature adjusting units 13 embedded, and in certain embodiments equidistantly spaced apart from each other, in the carrier body 12 to achieve the effect of lowering the ambient temperature around the temperature adjusting units 13 to form the temperature adjusting regions, thereby allowing the carrier body 12 to remain cool and comfortable, and increasing the convenience in the manufacturing thereof.

Figure 4:
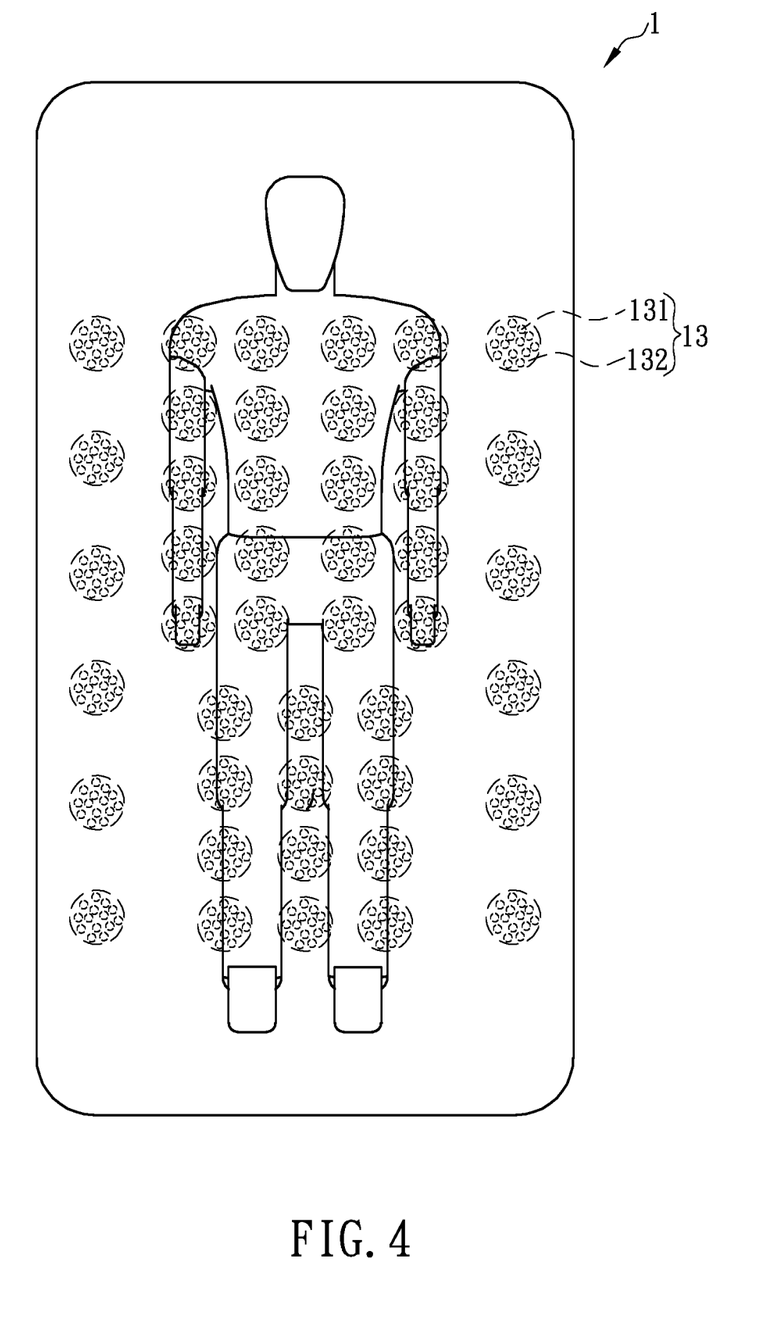
FIG. 4 is a top view of an air-permeable carrier according to certain embodiments of the present disclosure.

Referring to FIG. 4, the present disclosure is not limited to the embodiments in which the horizontal distances L and/or the vertical distances H between the plurality of the temperature adjusting units 13 remain the same or substantially the same. In certain embodiments, where the air-permeable carrier 1 is manufactured as a mattress, the manufacturer can customize the air-permeable carrier 1 according to practical requirements. Since a core body region of the human body has a relatively higher temperature, an area of the carrier body 12 corresponding to the core body region of the user when the user lies upon the carrier body 12 can be more densely adhesive-dispensingly injected with the temperature adjusting units 13 to form areas of the temperature adjusting regions having denser temperature adjusting units 13 (e.g., areas have smaller horizontal distances L), so as to increase thermal conductivity. In areas of the carrier body 12 surrounding the area corresponding to the core body region of the user, since the user lies upon these areas less frequently, the temperature adjusting units 13 can be less densely adhesive-dispensingly injected (e.g., areas have greater horizontal distances L) in these core-body-region-surrounding areas. Therefore, after the user lies upon the carrier body 12, through thermal conductivity by the temperature adjusting units 13, the phase change microcapsules 131 can transfer heat from the core body region of the human body to the surroundings through the pores of the carrier body 12, so that the heat is transferred to the air of the surrounding environment, rapidly lowering the temperature through the temperature of the external environment, increasing the heat dissipating efficiency of the air-permeable carrier 1, and keeping the carrier body 12 cool, such as to afford a user with a more comfortable environment when lying down, without the need for frequent usage of temperature-adjusting electronic devices such as air conditioners or heaters. In certain embodiments, an area of the air-permeable carrier 1 where the head of the user would rest upon is not injected with any temperature adjusting unit 13, since a pillow would generally be placed at a head of the mattress. Considering that the pillow would have a certain thickness, which makes it difficult for a temperature adjusting unit 13 to effectively dissipate heat, not injecting the temperature adjusting unit(s) 13 in an area of the carrier body 12 that corresponds to the head of the user can save manufacturing costs. However, the present disclosure is not limited thereto.

Figure 5:
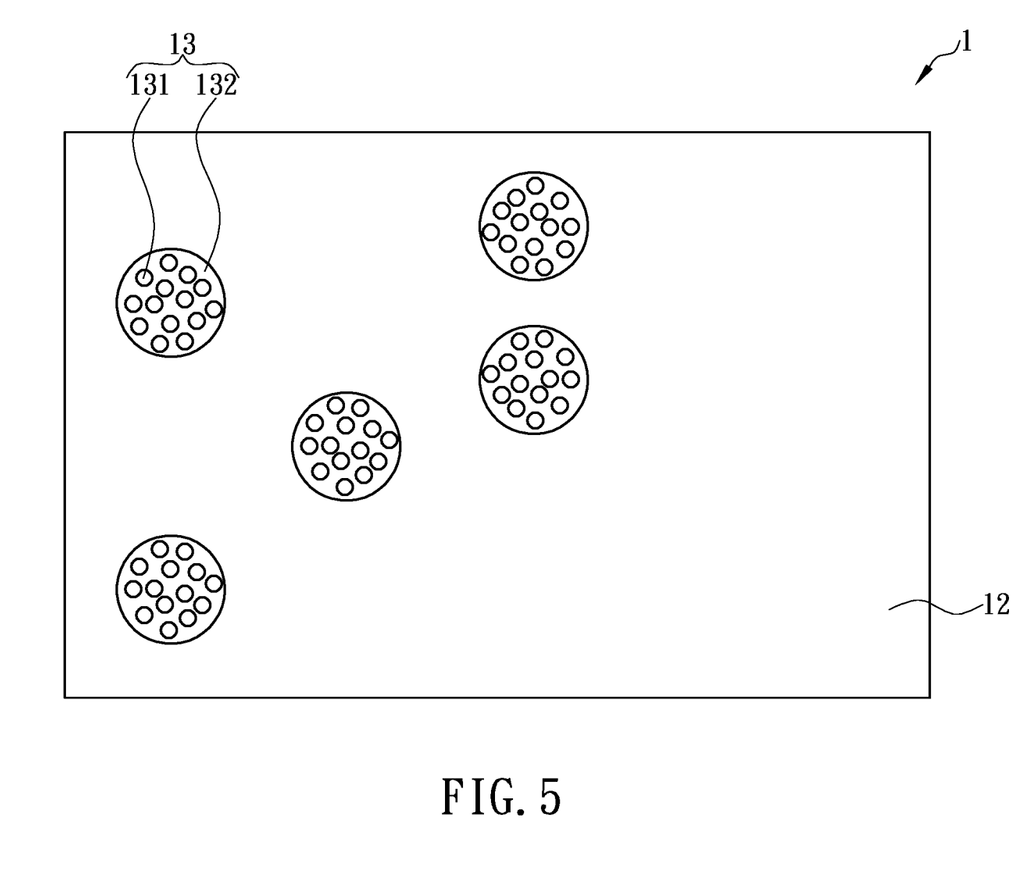
FIG. 5 is a side view of an air-permeable carrier according to certain embodiments of the present disclosure.

Referring to FIG. 5, in certain embodiments, where the air-permeable carrier 1 is manufactured as a protective gear, the vertical distances between any two adjacent temperature adjusting units 13 in the carrier body 12 can be the same, substantially the same or different from each other, and the horizontal distances between any two adjacent temperature adjusting units 13 in the carrier body 12 can be the same, substantially the same or different from each other. Since the protective gear will naturally fold or bend when the protective gear is worn on the user, the distance between the skin of the user and each of the temperature adjusting units 13 can be adjusted through adjusting the positions of the temperature adjusting units 13 in the carrier body 12. Furthermore, when the protective gear is worn on the user, heat can be more easily generated and accumulated at the flexion surfaces of the body joints of the user. Accordingly, the temperature adjusting unit(s) 13 can be more densely adhesive-dispensingly injected into the area(s) of the carrier body 12 that corresponds to the flexion surfaces of the body joints of the user, so as to increase heat dissipation efficiency, while the temperature adjusting unit(s) 13 can be less densely adhesive-dispensingly injected into the area(s) of the carrier body 12 that surround the flexion surfaces of the body joints. In this way, when the carrier body 12 is worn on the user, the skin of the user will not press against and cover the phase change microcapsules 131, and the heat accumulation generated from exercise would not be unable to be dissipated. In addition, the phase change microcapsules 131 can be communicated with air from the surrounding environment through the pores of the carrier body 12, and can indirectly absorb heat from the user through the carrier body 12, so as to rapidly lower the temperature through the temperature of the external environment and allow the carrier body 12 to remain cool and comfortable, such that the user can avoid feeling hot and stuffy even when exercising.

Figure 6:
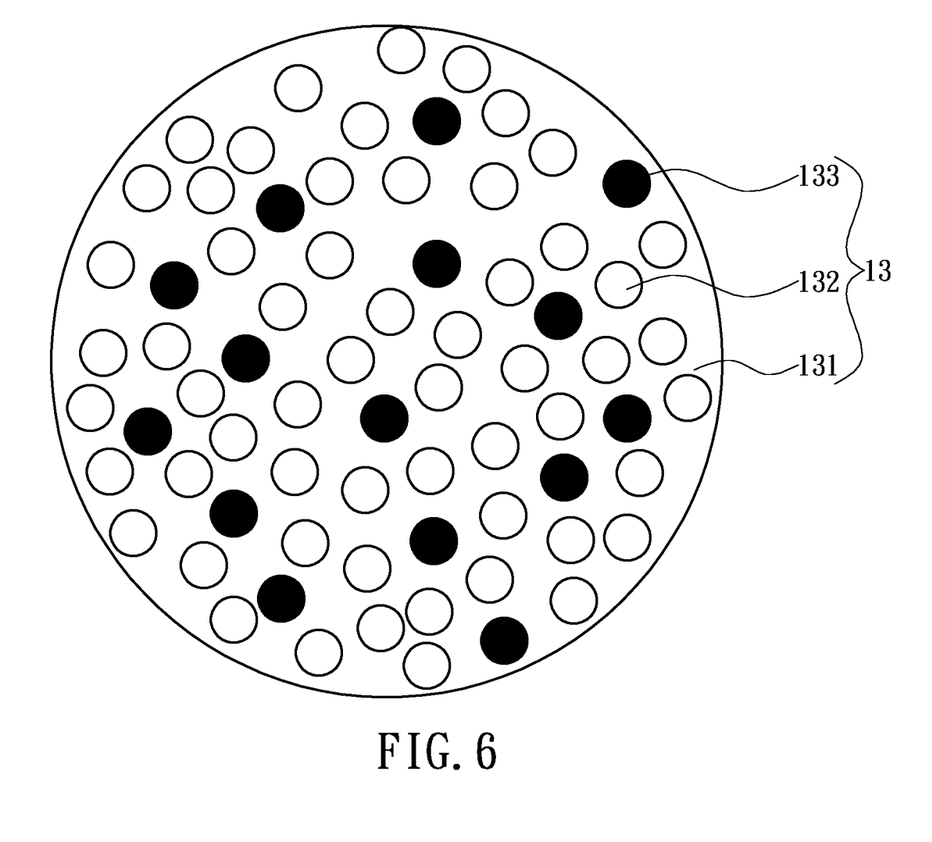
FIG. 6 is a schematic view of a temperature adjusting unit which includes a high thermal conductivity material according to certain embodiments of the present disclosure.

Referring to FIG. 6, in certain embodiments, at least one of the temperature adjusting units 13 further includes a high thermal conductivity material 133. The high thermal conductivity material 133 can be at least one of graphene, boron nitride, aluminum oxide, etc. The characteristics of each of the foregoing materials will be further described infra in detail. It is noted that the volume of the high thermal conductivity material 133 is microscopic, and is indiscernible through the naked eye, and the high thermal conductivity materials 133 are only schematically shown in the figures of the present disclosure to illustrate their relative positionings. Graphene can be a kind of flat film structured by hexagonal honeycomb lattice composed of carbon atoms with sp2 hybrid orbitals, and is currently the thinnest yet hardest nanomaterial in the world. Since the connection between the carbon atoms are quite flexible, the carbon atom surface so formed can bend and deform when an external force is applied to the graphene, such that the carbon atoms do not have to adapt to the external force by rearranging themselves, thereby maintaining a stable structure. This stable lattice structure allows graphene to have excellent thermal conductivity. Boron nitride (BN) is a binary compound composed of the same number of nitrogen atom and boron atom, has a hexagonal layered structure similar to that of graphite, and can remain stable at 1000° C. in air, 1400° C. in vacuum and 2800° C. in inert gas. These characteristics also allow boron nitride to have excellent thermal conductivity. Spherical alumina (aluminum oxide) has high thermal conductivity, high insulation degree, high hardness degree, and high temperature resistance, wear resistance, and corrosion resistance, etc. Based on the above characteristics, a manufacturer can, according to practical requirements, mix the plurality of phase change microcapsules 131 and the high thermal conductivity material 133 at a ratio of 55.0-99.9:0.1-45.0 based on percent by weight, so as to provide the temperature adjusting units 13 with better thermal conductivity.

Since the present disclosure adopts an adhesive-dispensing injection process, as long as the pressure produced by the adhesive dispensing machine, the amount of adhesive-like material, the speed of dispensing the material, and the timing of dispensing and stop dispensing the material can be controlled with and by the adhesive dispensing machine, any uneven objects can be applied with the injection and technique provided by the present disclosure, so that each of the temperature adjusting units 13 can be distributed and fixedly embedded within the carrier body 12. Therefore, the thickness, size, and shape of the carrier body 12 is not limited, and the air permeability can be increased to achieve the effect of maintaining a constant temperature by the phase change microcapsules 131. The carrier body 12 also has the advantages of having a simple structure and being implemented easily upon products of different shapes and sizes.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:
1. An air-permeable carrier, comprising:
   a single flexible carrier body having a plurality of pores, wherein the single flexible carrier body is made of at least one of at least one fiber assembly and microporous elastomers; and at least one temperature adjusting unit injected in the single flexible carrier body, filled in at least one of the pores in a partial region of the single flexible carrier body, and comprising an adhesive and a plurality of phase change microcapsules mixed in the adhesive, wherein at least one region of the air-permeable carrier proximate and corresponding to the temperature adjusting unit forms at least one temperature adjusting region, and each of the at least one temperature adjusting unit is located entirely within, and without being exposed from, at least one of the at least one fiber assembly and the microporous elastomers of the single flexible carrier body.

2. The air-permeable carrier according to claim 1, wherein the temperature adjusting unit further comprises a high thermal conductivity material.

3. The air-permeable carrier according to claim 1, wherein a ratio of a percent by weight of the phase change microcapsules to a percent by weight of the adhesive is 50.0-90.0: 10.0-50.0.

4. The air-permeable carrier according to claim 2, wherein the high thermal conductivity material comprises at least one of graphene, boron nitride and aluminum oxide.

5. The air-permeable carrier according to claim 2, wherein a ratio of a percent by weight of the phase change microcapsules to a percent by weight of the high thermal conductivity material is 55.0-99.9:0.1-45.0.

6. The air-permeable carrier according to claim 1, wherein the microporous elastomers comprise at least one of polyurethane, polyethylene, ethylene-vinyl acetate copolymer, melamine, polyvinyl chloride, thermoplastic rubber, latex and silica gel.

7. The air-permeable carrier according to claim 1, wherein the at least one fiber assembly comprises at least one of polyester, polyamide, polyethylene, polypropylene, polyurethane and polyimide.

8. The air-permeable carrier according to claim 1, wherein a plurality of temperature adjusting units are embedded in the single flexible carrier body, and each horizontal distance between any two adjacent temperature adjusting units on at least one longitudinal cross section of the single flexible carrier body that are disposed in a horizontal row are substantially the same, or each vertical distance between any two adjacent temperature adjusting units on at least one longitudinal cross section of the single flexible carrier body that are disposed in a vertical column are substantially the same.

9. The air-permeable carrier according to claim 1, wherein a plurality of temperature adjusting units are embedded in the single flexible carrier body, and at least one horizontal distance between two adjacent temperature adjusting units is different from another vertical distance between two adjacent temperature adjusting units, or at least one vertical distance between two adjacent temperature adjusting units is different from another vertical distance between two adjacent temperature adjusting units.

10. A method for manufacturing an air-permeable carrier, wherein the air-permeable carrier comprises: a single flexible carrier body having a plurality of pores and made of at least one of at least one fiber assembly and microporous elastomers; and at least one temperature adjusting unit injected in the single flexible carrier body, filled in at least one of the pores in a partial region of the single flexible carrier body, and comprising an adhesive and a plurality of phase change microcapsules mixed in the adhesive, wherein at least one region of the air-permeable carrier proximate and corresponding to the temperature adjusting unit forms at least one temperature adjusting region, and each of the at least one temperature adjusting unit is located entirely within, and without being exposed from, at least one of the at least one fiber assembly and the microporous elastomers of the single flexible carrier body, and the method comprises:

placing the single flexible carrier body having the plurality of pores on a platform of an adhesive dispensing machine;

extending, by the adhesive dispensing machine, an adhesive-dispensing nozzle of the adhesive dispensing machine into a predetermined position in the single flexible carrier body according to at least one control signal, and injecting in the single flexible carrier body the at least one temperature adjusting unit comprising the adhesive and the plurality of phase change microcapsules mixed in the adhesive; and filling the at least one of the pores in the partial region of the single flexible carrier body with the at least one temperature adjusting unit to form the at least one temperature adjusting region corresponding to the predetermined position.

11. The method according to claim 10, wherein the temperature adjusting unit further comprises a high thermal conductivity material.

12. The method according to claim 10, wherein a ratio of a percent by weight of the phase change microcapsules to a percent by weight of the adhesive is 50.0-90.0: 10.0-50.0.

13. The method according to claim 11, wherein the high thermal conductivity material comprises at least one of graphene, boron nitride and aluminum oxide.

14. The method according to claim 11, wherein a ratio of a percent by weight of the phase change microcapsules to a percent by weight of the high thermal conductivity material is 55.0-99.9: 0.1-45.0.

15. The method according to claim 10, wherein the microporous elastomers comprise at least one of polyurethane, polyethylene, ethylene-vinyl acetate copolymer, melamine, polyvinyl chloride, thermoplastic rubber, latex and silica gel.

16. The method according to claim 10, wherein the at least one fiber assembly comprises at least one of polyester, polyamide, polyethylene, polypropylene, polyurethane and polyimide.

17. The method according to claim 10, comprising injecting a plurality of temperature adjusting units at different positions in the single flexible carrier body, respectively, wherein each horizontal distance between any two adjacent temperature adjusting units on at least one longitudinal cross section of the single flexible carrier body that are disposed in a horizontal row are substantially the same, or each vertical distance between any two adjacent temperature adjusting units on at least one longitudinal cross section of the single flexible carrier body that are disposed in a vertical column are substantially the same.

18. The method according to claim 10, comprising injecting a plurality of temperature adjusting units at different positions in the single flexible carrier body, respectively, wherein at least one horizontal distance between two adjacent temperature adjusting units is different from another vertical distance between two adjacent temperature adjusting units, or at least one vertical distance between two adjacent temperature adjusting units is different from another vertical distance between two adjacent temperature adjusting units.

* * * * *